United States Patent [19]
Ostrowski

[11] 3,884,850
[45] May 20, 1975

[54] CONTINUOUS ATMOSPHERIC DEPOLYMERIZATION OF POLYESTER

[75] Inventor: Henry S. Ostrowski, 3729 Country Ridge Rd., Charlotte, N.C. 28211

[73] Assignee: Fiber Industries, Inc., Charlotte, N.C.

[22] Filed: Feb. 13, 1970

[21] Appl. No.: 11,221

[52] U.S. Cl............ 260/2.3; 260/468 R; 260/473 R; 260/475 D; 260/485 G
[51] Int. Cl............................................ C07c 69/82
[58] Field of Search.......................... 260/475 D, 2.3

[56] References Cited
UNITED STATES PATENTS
2,727,882  12/1955  Vodonik............................ 260/475 P
3,344,091  9/1967  Russin et al. ....................... 260/2.3
3,506,622  4/1970  Higgins............................... 260/2.3

OTHER PUBLICATIONS
Etienne et al., Def. Pub. of Ser. No. 784,483, filed Dec. 17, 1968, published in 869 O.G. 1385, on 12/30/69, Def. Pub. No. T869,017.

Primary Examiner—Lorraine A. Weinberger
Assistant Examiner—E. Jane Skelly

[57] ABSTRACT

Process for the depolymerization of high molecular weight, i.e., fiber-formable, polyesters to low molecular weight oligomer depolymerizate in a continuous process at atmospheric pressure.

9 Claims, 3 Drawing Figures

THEORETICAL AMOUNT OF GLYCOL NEEDED TO DEPOLYMERIZE POLYETHYLENE TEREPHALATE TO A GIVEN CHAIN LENGTH

POLYETHYLENE TEREPHALATE MELTING POINT
AS A FUNCTION OF CHAIN LENGTH

3,884,850

CONTINUOUS ATMOSPHERIC DEPOLYMERIZATION OF POLYESTER

BACKGROUND OF THE INVENTION

This invention relates to polymerization processes and, more particularly, to improvements in the continuous production of polymethylene terephthalate polymers of dicarboxylic acids and dihydric alcohols wherein waste and scrap polyester material is depolymerized to low molecular weight oligomer depolymerizate in a continuous depolymerization process to be fed directly into batch or continuous polyester polymerization operations without deleteriously affecting polyester polymer properties. Even more specifically, the present invention concerns a continuous process for the depolymerization of fiber and film-forming polyethylene terephthalate scrap material, utilizing atmospheric pressure conditions, to a low molecular weight polyethylene terephthalate oligomer mixture which may be employed directly as feed material, i.e., 100 percent depolymerizate or 5 to 100 percent by weight depolymerizate, in polymerization procedures for producing polyethylene terephthalate of high intrinsic viscosity, for example, above 0.4 and where desired 0.8 to 1.5. The resulting polyethylene terephthalate is characterized by molecular weight, color and other properties such as percent purity required for production of shaped articles such as fibers and films, comparable to those of polymer prepared from 100 percent virgin monomer under essentially identical process conditions.

Commercial, melt phase, production of polyethylene terephthalate suitable for conversion into strong and durable shaped articles such as fibers or films usually involves either an ester-interchange or direct esterification route for preparation of terephthalate monomer which is subsequently polymerized into extrudable polymer of sufficient intrinsic viscosity by multi-step polycondensation processes. (Athough the feed for polymerization or polycondensation is termed in the 'art' monomer, the feed material is actually a mixture of true monomer, i.e., bis(hydroxyethyl) terephthalate or BHET, and low molecular weight oligomers containing up to about 5 to 15 repeating units based on terephthalic acid in the case of polyethylene terephthalate.)

In the ester-interchange reaction, a readily available or producible dialkyl dicarboxylate, i.e., dimethyl terephthalate, is reacted under ester-interchange conditions with the necessary glycol, i.e., ethylene glycol, to produce the desired monomeric ester, BHET in the case of ethylene glycol and dimethyl terephthalate or as discussed hereinbefore a low molecular weight oligomer mixture for subsequent polycondensation. Obviously, the ester-interchange method is not the most direct procedure for producing monomer since a dialkyl ester must first be obtained prior to conversion to the glycol ester. Recently, there has been disclosed in the patent and literature art processes by which terephthalic acid can be rapidly esterified by direct reaction with a glycol, i.e., ethylene glycol, 1,4-butanediol and the like, utilizing superatomspheric pressure conditions and temperatures above the boiling point of the glycol in closed-system operations. In this regard, see Munro and Maclean U.S. Pat. No. 3,050,533. Pressure conditions appear to enable the attainment of a sufficiently high percent esterification in the direct reaction sequence, without formation of significant amounts of reaction side products such as polyglycol ethers, to form a feed material for polycondensing that can be subsequently formed into films and fibers of excellent properties. Although the present invention is later described with particular reference to a continuous polyethylene terephthalate direct esterification-polycondensation process, it is of course understood that the principles described herein are equally applicable to scrap polymer produced from ester interchange monomers as well as numerous other polyesters of different monomer content as described in greater detail hereinafter.

For economic reasons it is in many instances desirable to return polyester scrap material directly to the polymerization system. For a variety of reasons large quantities of polyester waste are accumulated during polyester production, extrusion and post-extrusion processing, i.e., reject polyester, broken filaments, trim and the like. However, when high molecular weight solid polyester is fed as such along with virgin monomer to the polymerization reactor, numerous disadvantages are present, most notably of which are color formation, production of undesirable side products which lower product melting temperature, inhibition of polymerization which lowers final product viscosity and clogging of flow lines due to plugging with undissolved polymer. Because of these difficulties and the inferior characteristics of the final product, considerable effort has been expanded to develop commercially feasible procedures to rapidly depolymerize polyesters of high intrinsic viscosity to low molecular weight monomer of sufficient purity to enable direct incorporation into the polymerization system without deleteriously affecting final polymer properties. Prior art depolymerization and similar polyester decomposition techniques have been found objectionable in many respects when tried commercially during continuous operations. The primary drawbacks with respect to the art are, for example, the necessity of using various additives involving uneconomical procedures and producing physical changes in the final product of polymerization. As examples of the additive type technique, there may be mentioned the addition of a strong acid to precipitate terephthalic acid from a scrap-ethylene glycol system for re-esterification and the employment of ethylene oxide with molten scrap for monomer regneration purposes.

Other processes of the prior art necessitate the inconvenience associated with multi-step depolymerization, pressure requirements and batch operations. For instance, U.S. Pat. No. 3,257,335 to Whitfield, Jr. et. al. discloses a two-step depolymerization process where monomer must be continuously recycled to a dissolver containing scrap to accomplish partial depolymerization prior to a second depolymerization operation under superatmospheric pressure, and U.S. Pat. No. 3,344,091 to Russin et al. disclosing a batch operation utilizing the addition of a dialkyl ester to a mixture of glycol and scrap. Since Russin et al. state that their process is also operable in the absence of dialkyl ester, it is apparent that autogenic pressure is developed within his system. Ethylene glycol alone cannot dissolve significatn quantities of high molecular weight polyethylene terephthalate below the melting point thereof under atmospheric pressure conditions, an applied or autogenic pressure of about 50 p.s.i.g. being required. Russin's temperature of polymerization is well below the melting temperature of polyethylene terephthalate polymer.

Therefore, it is an object of the present invention to provide a process for the depolymerization of high molecular weight polyesters. More specifically, it is an object of the present invention to provide a process for continuously depolymerizing scrap polyester of high intrinsic viscosity at atomospheric pressure in a single step operation to low molecular weight oligomer mixture depolymerizate which can be directly fed into a polymerization system without deleteriously affecting polymer properties.

Another object of the invention is to provide a method for the continuous depolymerization of polyethylene terephthalate which does not require multistep operations or applied pressures. Still another object of the invention is to provide a process operating at atmospheric pressure for the depolymerization of high molecular weight polyesters of a dicarboxylic acid and a dihydric alcohol to the corresponding low molecular weight esters by the addition of approximately stoichiometric amounts of glycol and scrap following an initial charge of monomer to the system at temperatures below the melting point of the polymer.

THE INVENTION

In accordance with the present invention, it has now been found that high molecular weight polyesters prepared from a dicarboxylic acid and a dihydric alcohol can be depolymerized to a lower molecular weight depolymerizate suitable for direct introduction into a polymerization system by dissolving said polyester in the corresponding monomer and adding thereto a dihydric alcohol or functional derivative thereof and maintaining the resultant mixture at a temperature above the boiling point of the alcohol under substantially atmospheric pressure conditions until the desired degree of depolymerization has been attained.

With respect to a preferred embodiment of the invention, it has now been found that high molecular weight polymeric esters of dicarboxylic acids and dihydric alcohols can be depolymerized to low molecular weight oligomer mixtures by charging to a suitable reaction vessel said high polymeric ester, a stoichiometric excess of the amount of dihydric alcohol, corresponding to the glycol employed in the production of the ester, required to depolymerize back to the extent desired and an initial charge of solvent selected from the class consisting of lower molecular weight esters, oligomers, and polyesters of said dicarboxylic acid and said dihydric alcohol; heating the reaction mixture to a temperature above the boiling point of the glycol but below the melting point of the polymer for a time sufficient to effectuate the desired degree of depolymerization while maintaining the system under atmospheric pressure and continuously removing oligomer while continuously adding higher molecular weight polyester and glycol to the reaction system.

In one aspect of the invention, which may be considered as a more specific preferred embodiment thereof, the polymeric ester is depolymerized back to low molecular weight oligomer of melting point slightly in excess of the boiling point of the dihydric alcohol, assuring maximum depolymerization with minimal monomer boiloff.

With respect to polyethylene terephthalate, it has been found that reject and scrap material of fiber-formable quality i.e., 0.4 to 1.5 intrinsic viscosity can be continuously depolymerized at atmospheric pressure with as little as 10 to 15 percent ethylene glycol boiloff (boiling point of about 197°C) in the presence of about a 10 to 15 percent stoichiometric excess of glycol at a temperature above about 220°C., and preferably below 250°C., to produce monomer or, more precisely, an oligomer mixture of average chain length of about three monomer units based on terephthalic acid and melting at about 200°C. which can be fed into a polyester polycondensation system, i.e., 'low' polymerizer, with or without virgin monomer to produce polymer of excellent quality.

In another preferred embodiment of the invention, as disclosed in greater detail hereinafter, polytetramethylene terephthalate is depolymerized to low molecular weight monomer.

DETAILED DESCRIPTION

Figure 1:
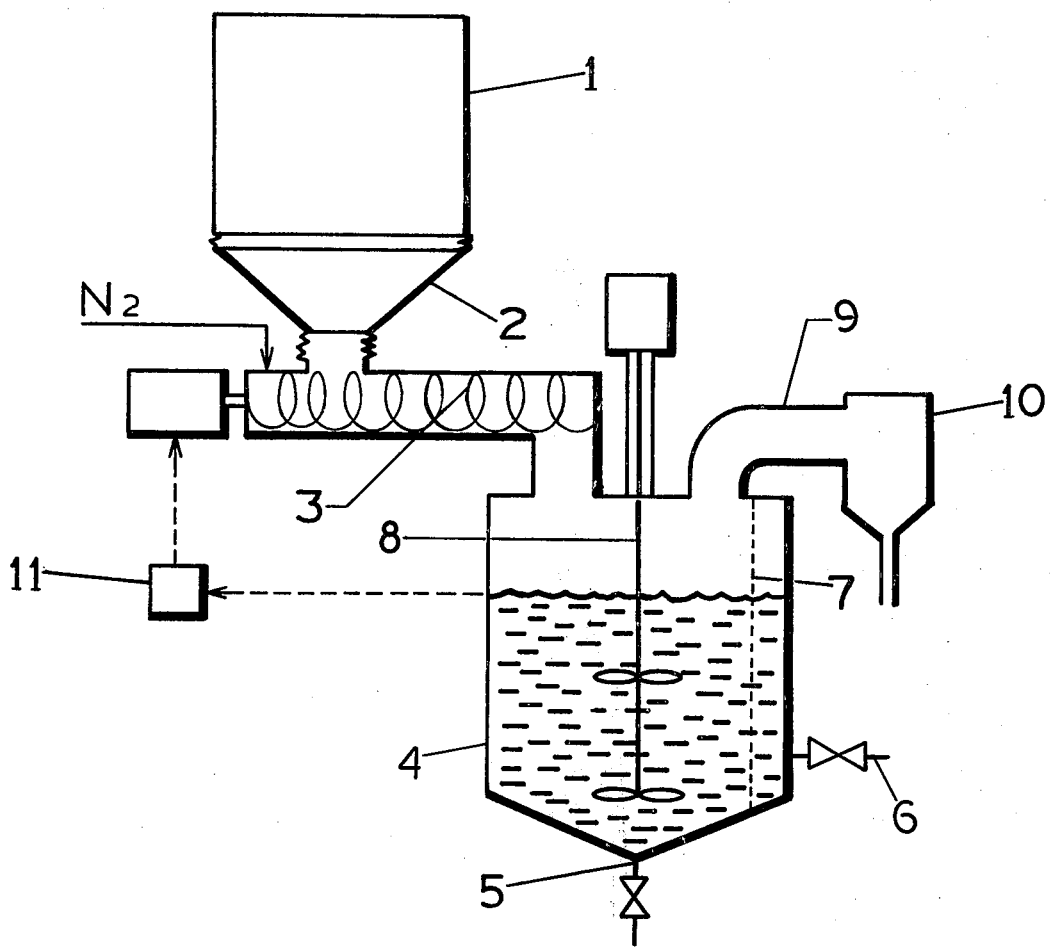
Figure 2:
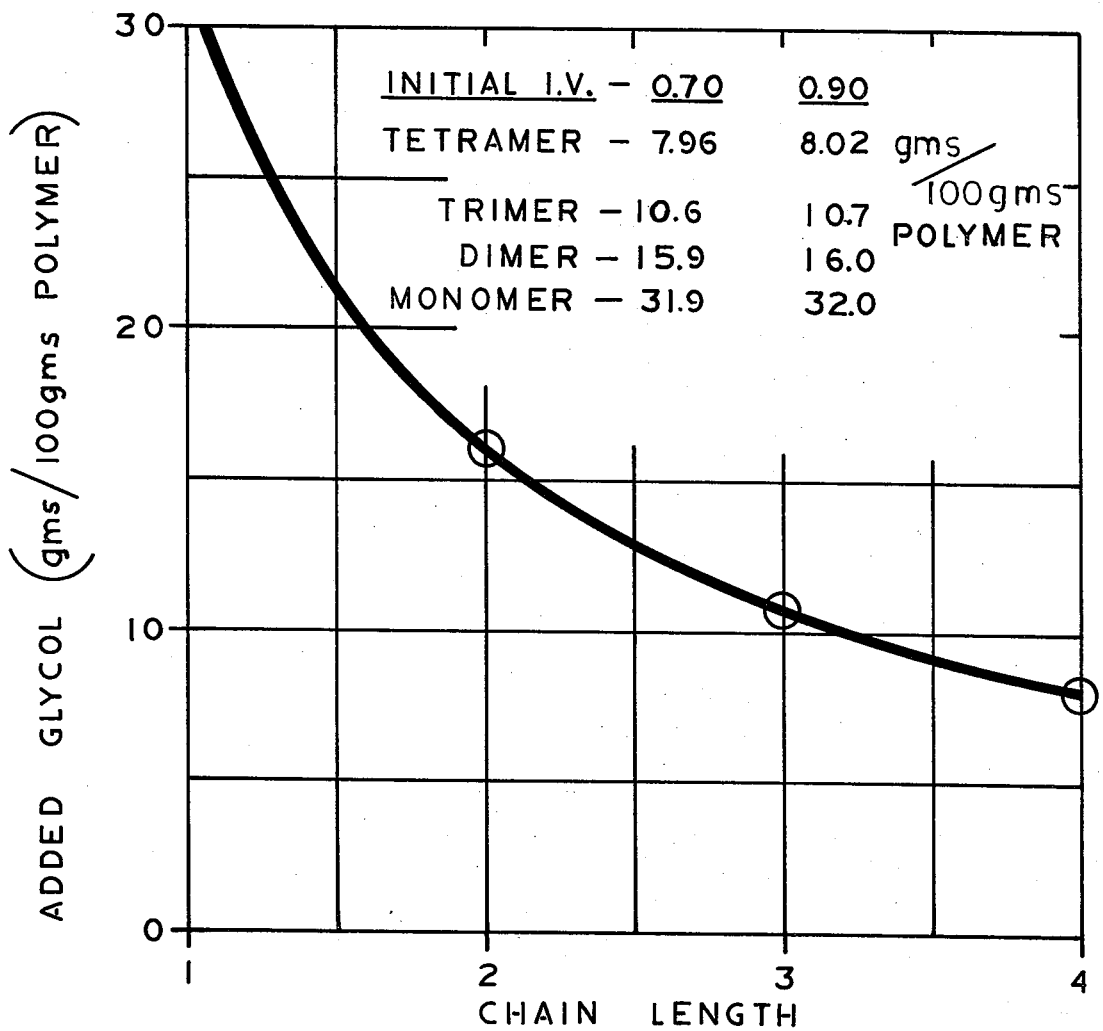
Figure 3:
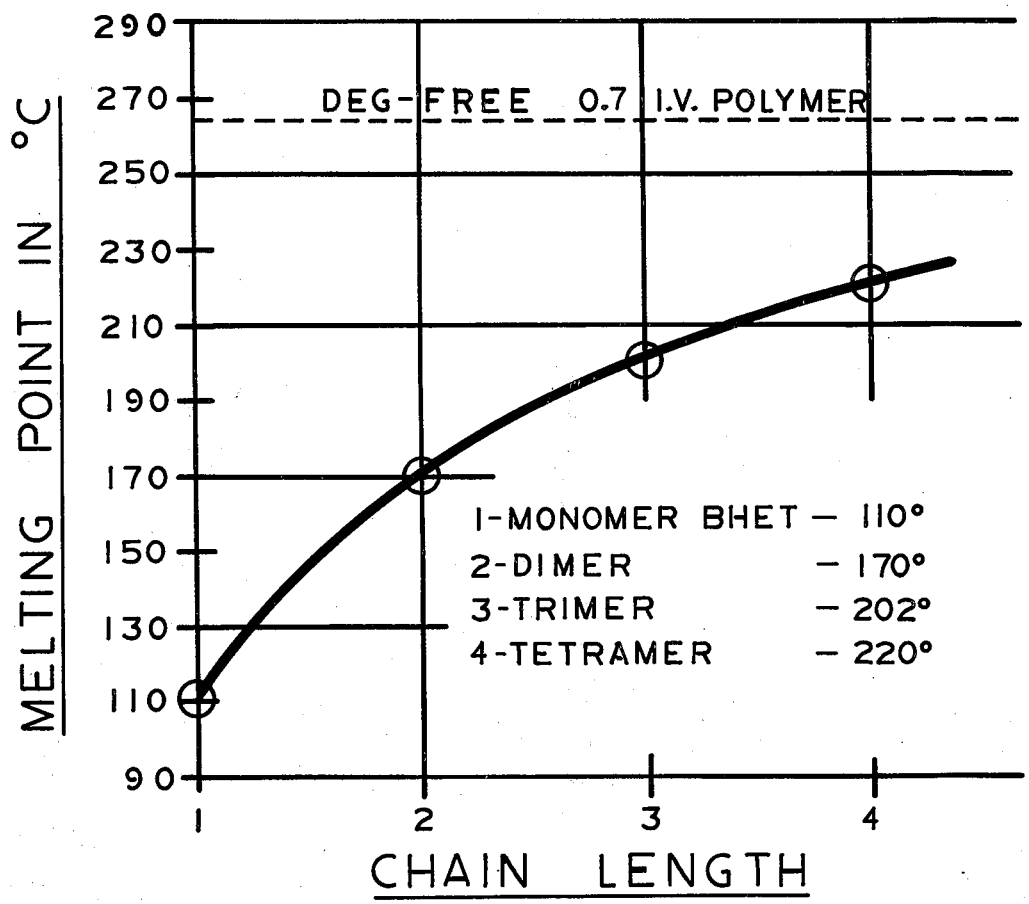

A better understanding of the invention may be obtained from the drawing wherein:

FIG. 1 schematically illustrates the continuous depolymerization process of the invention, FIG. 2 graphically represents the stoichiometric quantity of ethylene glycol required to depolymerize polyethylene terephthalate of average intrinsic viscosity within the range of about 0.70–0.90 to a given chain length and FIG. 3 graphically correlates polyethylene terephthalate melting point with chain length. Referring to FIG. 1, it is seen that particulate polyester is stored in a storage hopper 1 which contains a vibrating lower chamber 2 emptying into a vibrating screw feeder 3. As depicted, $N_2$ is forced through the screw feeder under slight pressure greater than about 0.01 p.s.i.g. to prevent glycol vapors from "blowing back" into the feeder and clogging the same. The waste and glycol are fed into the top of an agitated depolymerizer 4 equipped with a bottom drain 5 to remove foreign matter without process interruption, a side outlet 6 through which oligomer is passed to a first stage polyester polymerizer, a vertical screen 7 of small enough mesh, i.e., 10 to 50, to prevent comminuted matter from contaminating the oligomer effluent, and an agitator 8. The oligomer issuing from the polymerizer, preferably filtered, may be directly added to the first stage polymerizer as a sole feed or admixed with virgin monomer in any desired ratio, i.e., 1 to 99 parts by weight reconstituted oligomer and correspondingly 99 to 1 parts by weight virgin monomer but preferably about 1 to 25 parts reconstitued oligomer to about 99 to 75 parts virgin monomer. The rate of reaction in the depolymerizer is so rapid as to nearly eliminate excessive vaporization of glycol, only a quantity of glycol about 10 percent in excess fo the stoichiometric amount being required. However, for the purpose of vapor removal, a conduit 9 leads from the vapor space above the liquid to a spray condenser 10 in which a glycol or water spray condenses vaporous effluent which would consist primarily of glycol, small amounts of water and any volatile matter present such as yarn finish materials. Indeed, a distinct advantage of the invention is that most materials applied to the polymer subsequent to high polymerization, i.e., film antistatic coatings, yarn lubricants and the like, will "flash off" at the temperatures employed for depolymerization eliminating washing steps prior to depolymerization. The spray condenser can also serve an additional function where employed by creating a slight vaccum or siphoning effect which also prevents clogging within the feed lines.

A level control device 11 monitors the liquid level in the depolymerizer adjusting the flow of scrap from the feeder accordingly. Because different densities of scrap will affect the depolymerizer inventory level, one should not rely solely upon a measurement of weight addition per unit time as a proper guide for maintenance of desired depolymerizer volume inventory. The vessel should be agitated, although other means of agitation including manipulation of the depolymerizer may be employed, to prevent oligomer freezing in localized areas upon injection of glycol into the system. Rapid dissemination of glycol through out the system is also advantageous because depolymerization occurs nearly simultaneously with the dissolving of scrap in the glycol-oligomer mixture thereby minimizing glycol loss by vaporization. Once the steady-state reaction is reached, utilizing process conditions as described herein, the steady addition of approximately stoichiometric quantities of scrap and glycol, i.e., about 10 to 15 percent excess glycol by weight, correlated with oligomer rate of discharge from the vessel assures a continuous depolymerization reaction at temperatures above the boiling point of glycol under existing atmospheric pressure conditions.

The present invention is applicable to polyesters formed by the reaction of a dihydric alcohol and a dicarboxylic acid or ester-forming derivative thereof followed by polycondensation as described hereinbefore. Suitable glycols are those containing from about two to about 10 carbon atoms, preferably two to four carbon atoms, and as examples thereof there may be mentioned ethylene glycol, propylene glycols such as 1,3-propane diol, butylene glycols, such as 1,4-butane diol, neopentyl glycol, cycloalkylene-containing compounds such as tran-bis-1,4-(hydroxymethyl) cyclohexane, and aromatic glycols such as 1,4-bis-(2-hydroxyethyl) benzene. In general, the diol may contain any suitable organic moiety between hydroxyl groups but will most often be characterized by methylene radicals attached to terminal hydroxyl oxygen atoms. Additional examples of suitable glycols will be obvious to those skilled in the art, the term being employed to include diols capable of supplying the alcoholic moiety of esters formable into fiber-forming polymers. The terms "diol, " "dihydric alcohol, " "glycol" and the like, are used interchangeably herein to designate such compounds.

The dicarboxylic portion of the ester is a divalent radical which may be aliphatic, aromatic or a combination thereof. Suitable dicarboxylic acids, where the free acid is used to supply the dicarboxylic radical, are therephthalic acid, maleic acid, adipic acid, azelaic acid, isophthalic acid, bibenzoic acid, the various hydrogenated phthalic acids, and the naphthalene dicarboxylic acids, e.g., 1,5-and 2,6-naphthalene dicarboxylic acids, e.g., 1,5-and 2,6-naphthalene dicarboxylic acids, 4,4'-dicarboxydiphenoxyethane, hydroxycarboxylic acids of pivalolactone and the like. Of course, copolyesters are within the scope of the present invention wherein a mixture of two or more dicarboxylic acids, including the ester-forming derivatives thereof, and/or two or more dihydric alcohols and/or one or more dihydroxydicarboxylic acids may be employed. Of particular note in addition to polyethylene terephthalate are polytetramethylene terephthalate and copolyesters formed from varying amounts of adipic and terephthalic acids in combination with ethylene glycol, i.e., a copolyester containing at least 75 percent terephthalate units. The most preferred polyester, polyethylene terephthalate, is used to exemplify the invention.

The scrap polyester employed in the invention should be relatively free of foreign matter but generally need not be pre-washed unless it has been converted into ultimate product form during which various coatings and the like have been applied which may not vaporize at reaction temperatures. Those skilled in the art will be cognizant of the types of foreign matter which need not be removed prior to introduction into the reaction system and vice-versa. Conventional yarn finishes, of course, may "flash off" during solvation.

Particle shape and size may vary widely depending upon the source, such as spun waste, hard waste such as extrusion ends and chip waste, film, staple tow, and the like. The essential requirement is to assure rapid and thorough dissolution of scrap in the glycol-oligomer mixture. To this end, it is recommended that waste and scrap be segregated according to origin, i.e., staple fibers, molded chips, film, etc. and reduced to a relatively uniform size prior to being fed into the depolymerizer. Various combinations of waste sub-division according to principles well-known to those skilled in the art are applicable, involving the employment of various machinery such as the guillotine, cutter, granulator, pelletizer, and the like. As an example, fiber waste could be initially passed through a cutter, then granulated and finally reduced into floc of high density by means of a compactor or pelletizer. Particle shape will be regulated by the specific sub-dividing process employed. As a general guideline, but more importantly because of the rapid rate of reaction coupled with the known correlation between available surface area and rate of dissolution, it is recommended that overall average particle surface area be below about 0.5 in.$^2$ with at least one surface dimension less than 0.25 in.

Following comminution, the floc should be continuously fed to the depolymerizer in a smooth and steady stream with minimal fluctuation in rate and without clogging the feed line. Although various arrangements of machinery would suffice, it has been found that the particular apparatus arrangement depicted in the drawing consisting of a vibrating bottom discharge bin and a vibrating screw feeder in which the helix simultaneously rotates and rapidly reciprocates in an axial, up-and-down motion efficiently and continuously supplies particulate polyester with minimal variation in flow rate.

A consideration of FIGS 2 and 3 illustrates certain of the principles within which the present invention operates. In the case of polyethylene terephthalate, with ethylene glycol boiling at about 197°C, it is readily apparent that at atmospheric pressure the depolymerization reaction can proceed to the dimer-trimer region, about 2.7 unit average length chain oligomer, at which time equilibrium of reaction is reached in the liquid phase with only a relatively small amount of glycol, about 10 to 15, typically about 11.5, percent glycol per polymer weight to weight, being required for a stoichiometric reaction.

As would be expected, various inter-acting factors influence the rate of the depolymerization reaction, which factors where regulatable must be controlled in accordance with the variables resulting from their manipulation as well as desired results. The minimum operable temperature under atmospheric pressure conditions has been found to be the boiling point of the glycol. Below this temperature, sufficient energy, with resulting molecular cleavage, bombardment and the like, is not generated within the system to sustain a continuous reaction and/or the rate of reaction is too slow. The upper temperature limit cannot be stated with precision, depending upon the chemical and physical characteristics of the particular polyester and glycol involved. However, the skilled technician can readily recognize the desired upper limit of temperature because the vapor pressure of the glycol will suddenly begin to rise at such a rapid rate that a high percentage of glycol, ranging up to about 50 percent based on feed glycol, will be lost in the vaporous effluent. A rough guide to bear in mind to indicate the approximate optimum temperature will be to calculate the mean temperature between the boiling point of the glycol and the temperature at which glycol losses rapidly rise to about 50 percent. The temperature of reaction should be within a few degrees, i.e., about 0° to 10° centigrade, of the mean temperature. The optimum temperature and residence time are further refined by balancing color deterioration caused by high temperature and long residence time, and large glycol loss, against the higher variability in the depolymerized oligomer when employing a lower temperature and a shorter residence time, and consequently a lower glycol loss.

The rate of glycolysis of polyethylene terephthalate at temperatures below about 220°C, i.e., 200°–220°C but still above the boiling point of glycol, decreases substantially allowing vaporization of significant quantities of glycol prior to reaction. As temperatures reach the 250°–260°C and above ranges, even though the reaction occurs almost simultaneously with glycol addition, vaporization is even more rapid than rate of reaction requiring a large excess of glycol to sustain a continuous depolymerization. Thus, with depolymerization of polyethylene terephthalate at atmospheric pressure with minimal glycol loss, the temperature should be within the range of about 220°–250°C and preferably about 230°–240°C.

Average residence time in the continuous process should be as short as possible, as long as product uniformity and degree of depolymerization desired are not significantly affected, to prevent undesired product discoloration. With polyethylene terephthalate and ethylene glycol at the preferred temperature range, a 1.5–2 hour residence time enables production of a uniform product melting at about 190°C and having a color upon repolymerization comparable to virgin polymer. An excess residence time develops undesirable yellowness in the monomer which is transferred to the polymer subsequently formed therefrom. Additionally, prolonged residence time appears to increase the diethylene glycol content of resultant polymer as compared to polymer prepared from virgin monomer and from reconstituted monomer from a shorter residence time process under the same polymerization conditions. Polymer melting point, critical in many high temperature applications, is depressed approximately 3°C for each 1 percent increase in diethylene glycol content of the polymer.

The solvent employed for initial solvation of the high molecular weight polyester can be selected from oligomer or monomer compositions in which the polyester is soluble at the temperatures employed under atmospheric presure conditions. Of course, where the depolymerization is part of a continuous polyester-forming process with depolymerizate being continuously prepared and fed with virgin monomer, i.e., 5 to 100 percent by weight depolymerizate, into polymerization and/or polycondensation systems, the solvent should be formed from the same glycol and dicarboxylic acid as the polymer to be depolymerized, and repolymerized during high molecular weight development phases of the process.

Considering depolymerization of polyethylene terephthalate, the preferred solvent will be selected from half ester (monohydroxyethyl terephthalate), ester [bis-(hydroxyethyl) terephthalate], oligomers, and low molecular weight polyesters in liquid phase at the temperature of depolymerization as defined above and mixtures thereof. It is apparent that such a solvent will not interfere with the depolymerization or repolymerization reactions and would be continuously and inherently generated during depolymerization to further react with glycol and polymer. Of course, certain other compositions may be admixed with the solvent initially employed for desired purposes, for example, viscosity regulation. To avoid interference with the depolymerization and/or repolymerization reaction sequences, as well as side-product formation, adjunctive solvents should be selected from materials inherently present during either reaction, for example, dihydric alcohol (ethylene glycol in the case of polyethylene terephthalate) and/or water. It should be understood that the initial charge of solvent, which is preferably a low molecular weight oligomer mixture or essentially 100 percent ester, including the half ester, could contain in admixture therewith, ethylene glycol. In such instance, of course, desired reaction temperature should be reached simultaneously with injection of the scrap polyester into the system. Similarly, the amount of glycol employed at start-up, if significant, should be included in calculating the rate of subsequent glycol addition.

The following examples are presented to illustrate the invention and are not intended to limit the invention in any manner.

EXAMPLE I

To a stirred reactor under atmospheric pressure conditions maintained at 230°C and initially containing 1.8 pounds bis-(hydroxyethyl) terephthalate, chipped polyethylene terephthalate of surface dimensions as described and of about 0.67 intrinsic viscosity as measured in ortho chlorophenol at 25°C and ethylene glycol are continuously fed as described in Table I. Oligomer is removed at a rate to allow the indicated average residence times. Depolymerization of 1 pound of the polyester chip to trimer (melting point of 203°C) theoretically requires 0.11 pound of ethylene glycol. Glycol losses are calculated by substracting the quantity of glycol theoretically required to depolymerize the polymer to oligomer of the stated melting point from the actual amount added.

TABLE I

| Experiment | Residence Time (Hours) | Polyester Feed Rate (lbs/hour) | Glycol Feed (Pounds/ pounds polyester) | Oligomer Melting Range | Approx. Glycol Loss (%) |
|---|---|---|---|---|---|
| IA | 1.5 | 1.65 | 0.19 | 195–205 | 35 |
| IB | 3 | 0.83 | 0.12 | 185–195 | 0 |

The oligomer from Experiment IB is slightly discolored as compared with IA oligomer and virgin monomer. This example illustrates the depolymerization process and the balance required between residence time and other process parameters for production of depolymerizate of desired properties.

EXAMPLE II

Polyethylene terephthalate of 0.67 I. V. in chip form of surface dimensions as described is continuously depolymerized utilizing the depolymerization system of FIG. 1. In each case, the depolymerizer is initially primed with 50 pounds bis-(hydroxyethyl) terephthalate monomer. The results and process parameters are tabulated in Table II.

This example compares properties of polymers produced from virgin monomer and 100 percent depolymerizate monomer. It is seen that polymer properties are comparable and entirely suitable for most end-use applications. Of course, during continuous operations, only about 5 to 50 percent by weight of depolymerizate would be included within the feed to the low polymerizer. Typical polymer values would be an intrinsic viscosity of about 0.5 to 0.8, free carboxyl end groups concentration of about 20 to 35 microequivalents/gram, diethylene glycol content of about 2 to 4 percent, a melting point of about 254° to 258°C and a luminance minus yellowness rating of about 20 to 60. In fact, up to about 5 percent by weight reconstituted monomer can be incorporated into a typical feed

TABLE II

| Experiment | Average Depolymerizer Temperature (°) | Polyester Feed Rate Pounds/ Hour | Glycol Feed Pounds/ Hour | Glycol Feed Pounds/ Pounds Polyester | Mole % Diethylene Glycol in Monomer | Oligomer Residence Time (Hours) | Oligomer Melting Range (°C) | Approx. Glycol Loss (%) |
|---|---|---|---|---|---|---|---|---|
| IIA | 245 | 50 | 6 | 0.12 | 1.0 | 2.8 | 190–230 | 11 |
| IIB | 240 | 100 | 12 | 0.12 | 1.0 | 1.4 | 185–200 | 11 |
| IIC | 240 | 50 | 6 | 0.12 | 1.5 | 5.0 | 190–210 | 11 |

This example shows that the small scale process of Example I can be scaled up to much larger (commercial) size with reduced glycol losses and several oligomer melting ranges depending upon operating conditions.

EXAMPLE III

The oligomer from Experiment IIC is polymerized by a two-stage polycondensation consisting of a first stage low polymerization for one-half hour at 265°C under a pressure of 30–40 mm Hg and a second stage high polymerization for 4 hours at 283°C under an increased vacuum of 2.0 mm Hg. Polymer characteristics are compared with polymer produced from direct esterification virgin monomer under the same process conditions in Table III.

for polycondensation without an observable change in the polymer values tabulated in Table III.

EXAMPLE IV

The stirred reactor of Example I is filled with 2.0 pounds of low molecular weight oligomer of poly(1,4-butylene terephthalate) and the temperature is raised to 150°C to melt it. Poly-(1,4-butylene terephthalate) having an RV of 25** is continuously fed to the reactor, which is maintained at a temperature of 242° to 245°C, at a rate of 0.56 pounds per hour while 1,4-butanediol is fed at a rate of 0.18 pounds per hour. Depolymerized polymer is removed at 0.62 pounds per hour, thus providing a residence time in the reactor of 3.6 hours. The melting range of the low molecular weight oligomer collected from the reactor stabilizes in

TABLE III

POLYMER CHARACTERISTICS

| | Intrinsic Viscosity | COOH (Microequivalents/ gram) | Mole Percent Diethylene Glycol | Melting Point (°C) | Luminance* | Yellowness* | Luminance Minus Yellowness |
|---|---|---|---|---|---|---|---|
| Polymer from Virgin Monomer | 0.69 | 35 | 1.35 | 259.8 | 60 | 8 | 52 |
| IIC | 0.62 | 25 | 2.35 | 257.5 | 63 | 34 | 29 |

*As determined by the Colormaster method. A luminance minus yellowness value within the range of above about 20 is acceptable for further processing into shaped articles, i.e. films and filaments.

the range 170°–184°C. This calculates to be approximately tetramer. The relevant data for this example is given in Table IV.

** as measured at a concentration of 8 g/ld in orthodichlorophenol at 25°C

TABLE IV

| Reactor Temperature | Residence Time | Polymer Feed Rate | 1,4 Butanediol Feed Rate | Oligomer Melting Range | Glycol Loss |
|---|---|---|---|---|---|
| 242–245°C | 3.6 Hrs. | 0.56 Pound/Hour | 0.18 Pound/Hour | 170–184°C Average | 66%* |

*mostly to tetrahydrofuran

The tetrahydrofuran loss can be minimized by adding tetrahydrofuran suppressants to the reactor, as is known to those skilled in the art.

The above example demonstrates the utility of this atmospheric depolymerization process for providing low molecular weight oligomers of other polymers, and indicates the broad utility of the process for polyesters.

The optimum temperature of reaction for polytetramethylene terephthalate depolymerization is determined as discussed hereinbefore for polyethylene terephthalate, and typically will be within the range of about 230°C to 250°C, preferably 230°C to 240°C.

Various modifications of the invention will appear obvious to those skilled in the art.

What is claimed is:

1. A process for continuously depolymerizing high molecular weight linear polyester scrap said polyester being the polycondensation product of a dihydric alcohol and a dicarboxylic acid comprising dissolving said polyester scrap at an elevated temperature in a solvent which is liquid at the dissolving temperature, said solvent being selected from the group consisting of monomeric ester, bisester, low molecular weight esters and oligomers of said high molecular weight polyester to form a depolymerization mixture, continuously adding with said scrap polyester, dihydric alcohol corresponding to the dihydric alcohol of said polyester scrap in a stoichiometric excess sufficient to produce the desired degree of depolymerization to at least an oligomer, effecting said depolymerization under atmospheric pressure at a temperature above the boiling point of said dihydric alcohol but below the melting point of said polyester and continuously recovering lower molecular weight depolymerizate.

2. The process of claim 1 wherein said polyester is selected from the group consisting of polyethylene, polytrimethylene and polytetramethylene terephthalates.

3. The process of claim 1 wherein the polyester is polyethylene terephthalate and the temperature of depolymerization is within the range of about 220° to 250°C.

4. The process of claim 3 wherein the temperature is about 230° to 245°C.

5. The process of claim 4 wherein the solvent is bis-(hydroxyethyl) terephthalate.

6. The process of claim 1 wherein the average residence time in the depolymerizer is about 1 to 5.0 hours.

7. The process of claim 1 wherein the polyester is polytetramethylene terephthalate.

8. The process of claim 1 wherein the dihydric alcohol is used in an amount of up to about 15 percent by weight in excess of the stoichiometric requirement.

9. A process for continuously depolymerizing polyethylene terephthalate scrap to an oligomer mixture which comprises charging bis-(hydroxyethyl) terephthalate to a depolymerizer operating at about 220°–250°C under atmospheric pressure, continuously adding said polyethylene terephthalate and an amount of ethylene glycol up to about 15% by weight in excess of that required for stoichiometric depolymerization to an oligomer mixture of average chain length of about 2 to 3 monomer units based on terephthalic acid and a sufficient amount for maintenance of a continuous reaction to said depolymerizer, and continuously recovering said oligomer mixture therefrom.

* * * * *